June 29, 1948. J. J. ETTINGER 2,444,287
SURGICAL SCREW DRIVER WITH SCREW GRIPPING JAWS
Filed Jan. 17, 1946 3 Sheets-Sheet 1
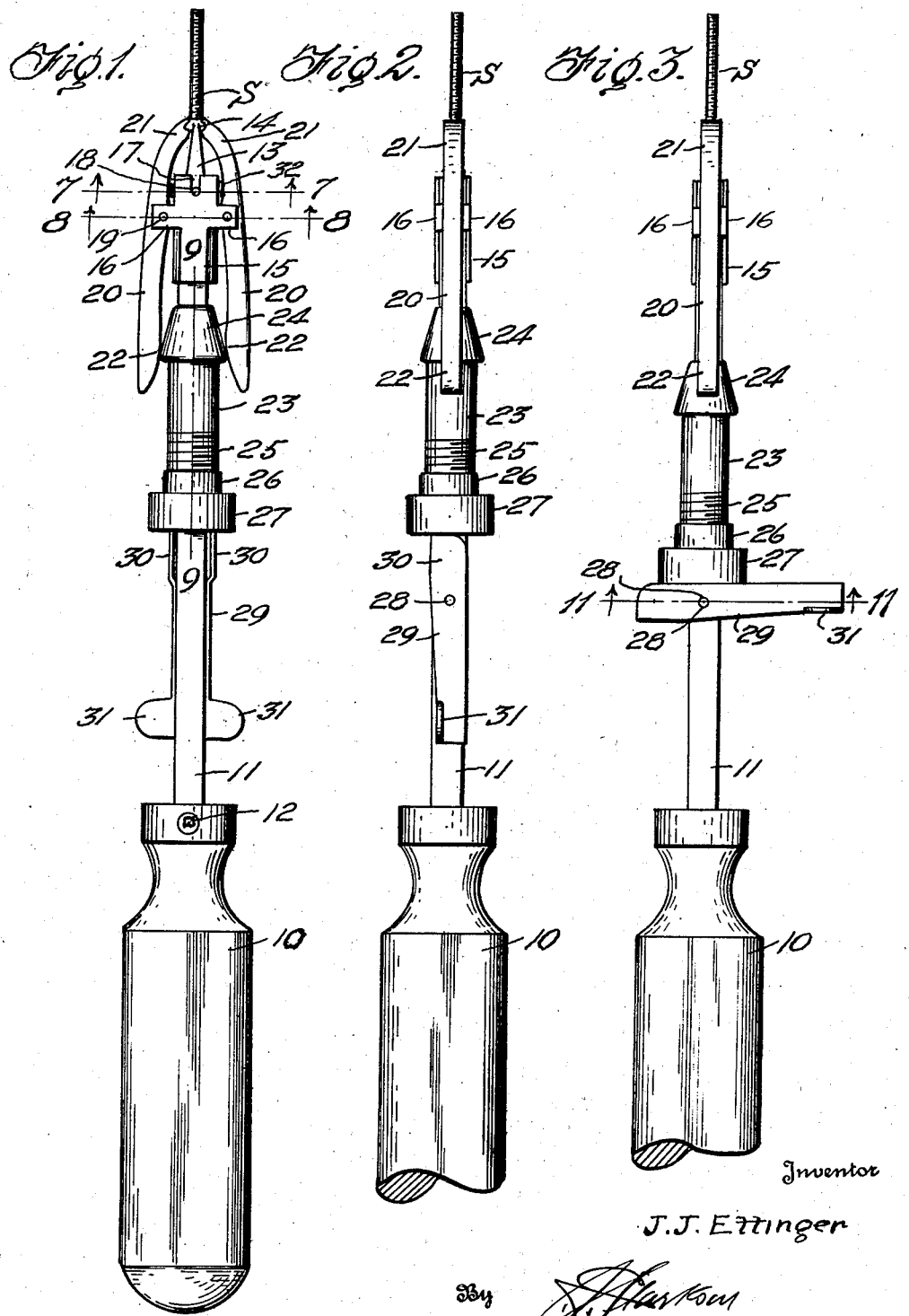
Inventor
J. J. Ettinger
By
Attorney

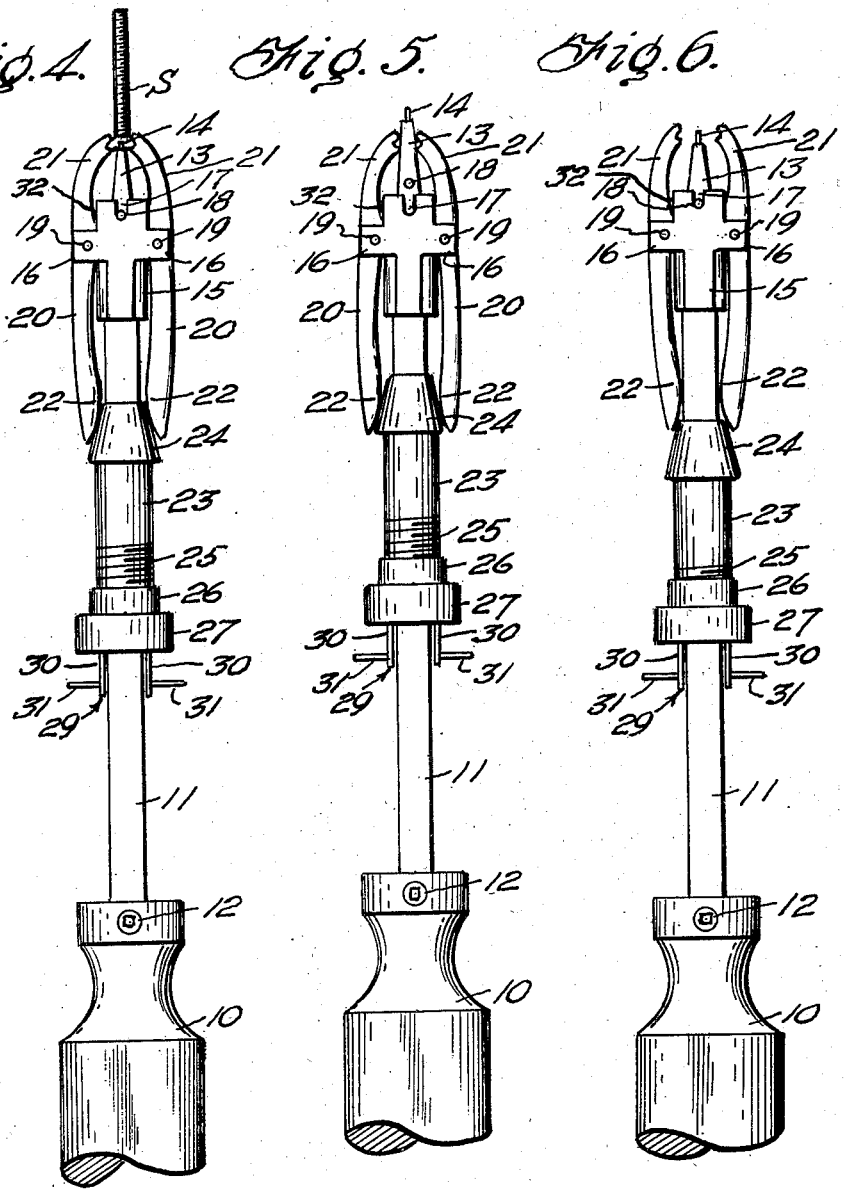

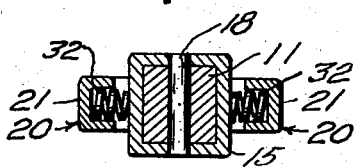
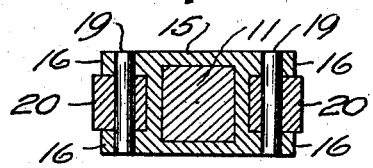
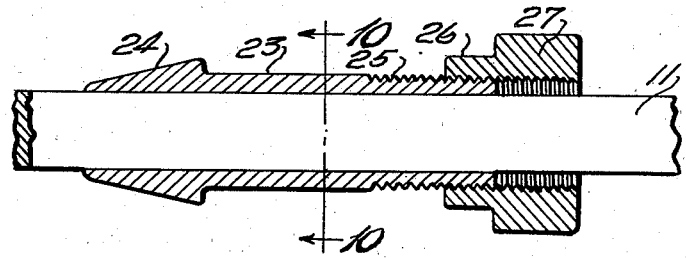
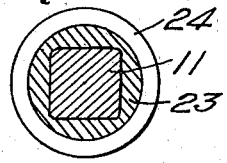
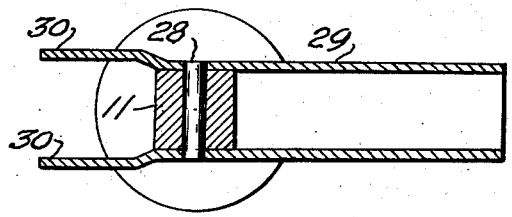

Patented June 29, 1948

2,444,287

UNITED STATES PATENT OFFICE 2,444,287

SURGICAL SCREW DRIVER WITH SCREW GRIPPING JAWS

Joe J. Ettinger, Warsaw, Ind., assignor to Zimmer Manufacturing Company, Warsaw, Ind.

Application January 17, 1946, Serial No. 641,690

4 Claims. (Cl. 145—52)

This invention relates to surgical appliances and has special reference to a surgical screw driver.

One important object of the invention is to provide a novel form of surgical screw driver particularly adapted for applying bone screws such as are used for securing metallic plates across fractures in bones.

A second important object of the invention is to provide an improved surgical screw driver having means for rapidly gripping and releasing the screws used in connection with such plates.

A third important object of the invention is to provide a novel arrangement in such a screw driver whereby a screw held by the screw driver is rigid relative to such driver.

A fourth important object of the invention is to provide a novel screw driver construction wherein gripping means for screw heads is adjustable to suit heads of various sizes.

A fifth important object of the invention is to provide an improved arrangement of head gripping and bit parts whereby the bit may be kept manually in engagement with the screw kerf after the screw head has been released from the gripping means.

With the above and other objects in view the invention consists in general of certain novel details of construction and combinations of parts hereinafter fully described, illustrated in the accompanying drawings and particularly claimed.

In the accompanying drawings like characters of reference indicate like parts in the several views, and:

Fig. 1 is a side elevation of the complete screw driver shown gripping a screw.

Fig. 2 is a similar view at right angles to Fig. 1.

Fig. 3 is a view from the same direction as Fig. 2 but with the gripping parts and other elements in screw head releasing position.

Fig. 4 is a view similar to Fig. 3 but taken from the same direction as Fig. 1.

Fig. 5 is a view similar to Fig. 4 but with the bit in protracted position and other parts in positions assumed under such conditions.

Fig. 6 is a view similar to Fig. 4 but showing the arrangement of the gripping means adjusted for maximum opening of the gripping jaws.

Fig. 7 is an enlarged section on the line 7—7 of Fig. 1.

Fig. 8 is an enlarged section on the line 8—8 of Fig. 1.

Fig. 9 is an enlarged fragmentary section on the line 9—9 of Fig. 1.

Fig. 10 is a section on the line 10—10 of Fig. 9.

Fig. 11 is an enlarged section on the line 11—11 of Fig. 3.

In the present drawings one preferred form of the invention is shown for gripping and screwing screws having a minimum and a maximum head diameter but it is to be understood that variations may be made in the sizes and proportions of parts whereby adjustment may be made between other minimum and maximum head diameters. For instance, while the present showing is adapted for the usual range of bone screws, a change in size and proportions will enable the invention to be used in handling the very small screws used in assembling watch movements and the like.

As here shown the device is provided with a handle 10 having a suitably knurled cylindrical surface. A shank 11 has its rear end engaged in this handle and there held by a screw 12. The shank 11 is preferably square in cross-section. At its forward end this shank is tapered to form a wedge shaped portion 13 which terminates in a parallel sided tip forming a bit 14. Slidably mounted on the forward portion of the shank is a rectangular sleeve 15 and from opposite sides of this sleeve project pairs of ears 16. In order to limit forward movement of this sleeve on the shank while permitting forward movement of the shank through the sleeve the remaining opposite sides of the sleeve are provided with forwardly opening slots 17 and through the shank extends a pin 18 the ends of which project and normally lie in the rear ends of the slots 17.

Between each pair of ears 16 extends a pin 19. On each pin is mounted, intermediate its ends, a lever 20 and these levers have their forward ends curved inwardly and notched to provide screw head gripping jaws 21. The rear ends of these levers extend along opposite sides of the shank 11 and have their inner surfaces curved to provide cam faces 22.

On the shank is slidably mounted a rear sleeve 23 having at its forward end a frusto-conical head 24 the minor base of which is forwardly positioned. The rear end of this sleeve is provided with an external screw thread whereon is fitted a nut 26 provided with a suitably knurled head 27 whereby the nut may be adjusted along the sleeve 23. A pin 28 extends through the shank 11 to the rear of the sleeve 23 and on the projecting ends of this pin is mounted a camming lever 29, this lever being split to straddle the shank 11 so as to provide a pair of cam arms 30 engaging the rear face of the nut 26. At its other end the lever 29 is provided with outwardly extending tabs or lugs 31.

By reference to Figs. 1 to 4 it will be seen that the head 24, when the sleeve is in its forward position, lies between the cam faces 22 of the levers 20 and thus effects biassing of these levers to bring the jaws 21 toward each other and thus grip the head of a screw S. This forward position of the sleeve is effected when the lever 29 is alined with the shank 11 as in Fig. 2. However, when the lever 29 is manually moved to extend transverse the shank 11, as in Fig. 3, the sleeve 23 is free to move rearwardly. In order to effect this rearward movement springs 32 are interposed between the sleeve 15 and the forward ends of the levers 20. These springs thus tend to bias the levers 20 against the action of the head 24. The inclination of the lateral face of this head and the shape of the cam faces 22 is such that, when the sleeve 23 is free to move rearwardly, a species of squeezing effect is caused on the head 24 which forces it rearwardly as best seen in Fig. 4. Thus the springs 32 not only effect biassing of the levers 20 to move the sleeve 23 rearwardly but the same biassing opens the jaws 21 and releases the head of the screw S.

Referring to Fig. 5 it will be seen that when the jaws 21 are opened and the screw head released, the shank 11 may be pushed forwardly through the sleeve 15 so that the bit 14 protrudes beyond the jaws. As this is done the sleeve 23 is carried forwardly with the shank and the levers 20 are biassed slightly against the action of the springs 32. The protrusion of the bit permits the screw to be driven solidly into position, the jaws 21 engaging the surface of the plate or the like into which the screw is driven. When the tool is disengaged from the screw the springs and the action between the head 24 and cam faces 22 restore the bit to its position as in Fig. 1. By adjusting the nut 26 on the sleeve 23 the effective distance between the head 24 and the camming lever 29 is varied, one extreme position being shown in Fig. 6.

In use the lever 29 is alined with the shank and the nut 26 is adjusted until a screw head of the size to be used is solidly grasped between the jaws 21. Then, after the tool has been set for a definite size of screw head all screws of the size may be quickly gripped and released by simple manipulation of the lever 29.

What is claimed is:

1. In a screw driver, a shank having a bit at its forward end, a sleeve mounted on said shank rearwardly of but adjacent to said bit, a pair of screw head gripping jaws pivoted to opposite sides of said sleeve and having rearwardly extending arms, a second sleeve slidable on said shank and having a wedge-like forward end engaging between said arms, and a camming lever pivoted to said shank rearwardly of said sleeve and manually moveable between a position to force the second sleeve forwardly, whereby to spread said arms and thereby move said jaws to screw gripping position, and a position to permit rearward movement of said second sleeve, said second sleeve carrying means adjustable therealong for varying the effective length of said second sleeve and engageable by said camming lever.

2. In a screw driver, a shank having a bit at its forward end, a sleeve mounted on said shank rearwardly of but adjacent to said bit, a pair of screw head gripping jaws pivoted to opposite sides of said sleeve and having rearwardly extending arms, a second sleeve slidable on said shank and having a wedge-like forward end engaging between said arms, a camming lever pivoted to said shank rearwardly of said sleeve and manually moveable between a position to force the second sleeve forwardly, whereby to spread said arms and thereby move said jaws to screw gripping position, and a position to permit rearward movement of said second sleeve, and spring means urging said jaws apart, the rearward inner ends of said arms and the inclination of the wedge-like sleeve and constituting cam surfaces urging said second sleeve rearwardly under the influence of said springs, said second sleeve carrying means adjustable therealong for varying the effective length of said second sleeve and engageable by said camming lever.

3. In a screw driver, a shank having a bit at its forward end, a sleeve mounted on said shank rearwardly of but adjacent to said bit, a pair of screw head gripping jaws pivoted to opposite sides of said sleeve and having rearwardly extending arms, a second sleeve slidable on said shank and having a wedge-like forward end engaging between said arms, and a camming lever pivoted to said shank rearwardly of said sleeve and manually moveable between a position to force the second sleeve forwardly, whereby to spread said arms and thereby move said jaws to screw gripping position, and a position to permit rearward movement of said second sleeve, said second sleeve having a nut threaded on its rear end for longitudinal adjustment therealong for varying the effective length of the second sleeve and engaged by said camming lever.

4. In a screw driver, a shank having a bit at its forward end, a sleeve mounted on said shank rearwardly of but adjacent to said bit, a pair of screw head gripping jaws pivoted to opposite sides of said sleeve and having rearwardly extending arms, a second sleeve slidable on said shank and having a wedge-like forward end engaging between said arms, a camming lever pivoted to said shank rearwardly of said sleeve and manually moveable between a position to force the second sleeve forwardly, whereby to spread said arms and thereby move said jaws to screw gripping position, and a position to permit rearward movement of said second sleeve, and spring means urging said jaws apart, the rearward inner ends of said arms and the inclination of the wedge-like sleeve and constituting cam surfaces urging said second sleeve rearwardly under the influence of said springs, said second sleeve having a nut threaded on its rear end for longitudinal adjustment therealong for varying the effective length of the second sleeve and engaged by said camming lever.

JOE J. ETTINGER.

REFERENCES CITED

The following references are of record in the file of this patent:

UNITED STATES PATENTS

| Number | Name | Date |
|---|---|---|
| 637,990 | Hoepner | Nov. 23, 1899 |
| 904,234 | Sievert | Nov. 17, 1908 |
| 1,124,498 | Millar | Jan. 12, 1915 |
| 1,293,525 | Osborn | Feb. 4, 1919 |
| 1,512,498 | Solop | Oct. 21, 1924 |
| 1,519,067 | Smith | Dec. 9, 1924 |
| 1,569,407 | Spartivento | Jan. 12, 1926 |